United States Patent
Hindawi et al.

(10) Patent No.: US 6,879,979 B2
(45) Date of Patent: Apr. 12, 2005

(54) METHOD TO REMOTELY QUERY, SAFELY MEASURE, AND SECURELY COMMUNICATE CONFIGURATION INFORMATION OF A NETWORKED COMPUTATIONAL DEVICE

(75) Inventors: David Salim Hindawi, Berkeley, CA (US); David Leigh Donoho, Berkeley, CA (US); Lisa Ellen Lippincott, Berkeley, CA (US); Orion Yosef Hindawi, Berkeley, CA (US); Peter Benjamin Loer, Oakland, CA (US); Dennis S. Goodrow, Santa Rosa, CA (US); James Milton Brown, Novato, CA (US)

(73) Assignee: Bigfix, Inc., Emeryville, CA (US)

( * ) Notice: Subject to any disclaimer, the term of this patent is extended or adjusted under 35 U.S.C. 154(b) by 252 days.

(21) Appl. No.: 10/226,709

(22) Filed: Aug. 22, 2002

(65) Prior Publication Data

US 2003/0061197 A1 Mar. 27, 2003

Related U.S. Application Data

(60) Provisional application No. 60/314,775, filed on Aug. 24, 2001.

(51) Int. Cl.$^7$ .............................................. G06F 17/30
(52) U.S. Cl. ...................... 707/3; 707/1; 707/3; 707/10; 715/523
(58) Field of Search .............................. 707/1, 3–4, 10; 715/523

(56) References Cited

U.S. PATENT DOCUMENTS

| 5,825,891 A | * | 10/1998 | Levesque et al. ........... 713/153 |
| 5,852,722 A | * | 12/1998 | Hamilton .................... 709/221 |
| 5,862,223 A | * | 1/1999 | Walker et al. ................ 705/50 |
| 6,256,664 B1 | * | 7/2001 | Donoho et al. ............. 709/204 |

* cited by examiner

Primary Examiner—Safet Metjahic
Assistant Examiner—Haythim Alaubaidi
(74) Attorney, Agent, or Firm—Glenn Patent Group; Michael A. Glenn

(57) ABSTRACT

The invention disclosed herein enables a collection of computers and associated communications infrastructure to offer a new communications process which allows a requestor to receive configuration information of a computational device from a responder. The requester first sends query documents that contain queries for configuration information of a computational device to the responder; the responder automatically collects the answers for the queries and sends a response document that contains the configuration information of the computational device to the requestor. The queries are written in a formal descriptive language which is transparent, safe for network evaluation, and extensible, and the configuration reader of the responder can parse the queries and automatically invoke a set of standard inspectors to obtain the corresponding configuration information.

31 Claims, 13 Drawing Sheets

```
*** The time that this document was processed ***
Q: now

*** Bios data ***
Q: version of bios
Q: date of bios

*** System and processor information ***
Q: vendor name of main processor
Q: system language
Q: speed of main processor
Q: number of processors

*** Operating system information ***
Q: name of operating system
Q: release of operating system
Q: major version of operating system
Q: minor version of operating system Q: key "Manufacturer" of section "General" of file
"oeminfo.ini" of the system folder Q: names of applications whose (value "CompanyName" of
```

```
create-or-replace snapshot "Current"
    make package-file "win_ini" from file "win.ini" of windows folder
    make answer-set "cdrom answers" from <cdrom.qna>
end snapshot create response with certificate <aset.crt> using 100 + ( (now -
local time "16 May 2001 18:51:00") / second) mod 9.
    send snapshot "Initial"
    send snapshot "Current"
end response
```

FIG. 14

BFAST
*BigFix Assisted Support Technology* — 950

QnA Correlator (All Q&A's compared in lower case.)

Number of files checked: 2 q: now (Number of files with question: 2)
a: fri, 22 jun 2001 11:23:22 -0700 (100.0 %)

q: version of bios (Number of files with question: 2)
a: phoenix rom bios plus version 1.10 a02 (100.0 %)

q: date of bios (Number of files with question: 2)
a: 11/30/00 (100.0 %)

q: user language (Number of files with question: 2)
a: english (united states) (100.0 %)

q: system language (Number of files with question: 2)
a: english (united states) (100.0 %)

q: speed of main processor (Number of files with question: 2)
a: 1484000000 hertz (100.0 %)

METHOD TO REMOTELY QUERY, SAFELY MEASURE, AND SECURELY COMMUNICATE CONFIGURATION INFORMATION OF A NETWORKED COMPUTATIONAL DEVICE

CROSS-REFERENCE TO RELATED APPICATIONS

This application is related to U.S. provisional patent application Ser. No. 60/314,775, filed on Aug. 24, 2001.

TECHNICAL FIELD

The invention relates to a new process of communication using computers and associated communications infrastructure. More particularly, the invention relates to a method to obtain configuration information about a computational device and communicate that configuration information to a requester.

BACKGROUND OF THE INVENTION

Nowadays computational devices are used in almost every area of our daily life, and the range of hardware devices and software applications installed on such devices, as well as the possible interactions and configuration options, is expanding rapidly. The development of the Internet and wireless communication networks adds another element—communications—where each device also has neighboring devices in its environment with which it interacts and communicates. Moreover, as devices become mobile, and as networks become dynamic—with devices being attached and withdrawn to networks in an ad-hoc fashion—describing the environment of a computational device becomes increasingly challenging and, at the same time, essential for understanding its function.

Against this background, we observe that an important task in many settings is to know the state or configuration of a remote computer. For example, it can be highly desirable for a vendor or technical support provider to know details of the configuration information of such a computational device in order to provide better customer service. Indeed, when the customer is experiencing difficulties with a product of the vendor, the technical support department of the vendor often needs to know the configuration information of the customer's computational device in order to trouble-shoot the product and provide a fix to solve the customer's problem. In another application, the technical 'help desk' of an enterprise—charged with keeping various personal computers, servers, and other network devices in good operating order—may need to know the configuration information of one or more such computational devices to perform trouble shooting or routine maintenance tasks. In another application, the manager of a 'server farm'— charged with offering services across the Internet from an array of computational devices—may need to know the process status of one or more server devices.

We remark that the term configuration is best interpreted in a broad sense, including the location of mobile devices, the status of connected devices, the status of links to connected devices, the activity and configuration of devices in proximity, and the status of remote devices in a relationship of trust and intimacy.

In the current state of art, the method of requesting, gathering and transmitting of configuration information of a computational device is often informal, manual, insecure, and time-consuming. In the example of the technical support scenario, a support technician has to communicate with a customer over telephone (sometimes even for hours) to instruct the customer in step-by-step fashion how to collect the configuration information that the support technician needs. It is usually very tedious to explain the detailed steps that the customer must take to gather the information, and many customers are unable or unwilling to apply the concentrated effort it would require to obtain the needed information. As a result, the process—where attempted—is often frustrating and difficult. An alternative approach may include exchanging e-mails between the support technician and the customer. This approach still faces problems of customer compliance, and in addition, it exposes the configuration information of the computational device to the hackers over the Internet. Furthermore, this process—if it works at all—may require several rounds of e-mail exchange before the customer can collect the right configuration information that the support technician needs.

Still another approach might be to use remote program execution (RPE), which includes the steps of: dispatching a codebody from the requestor to the target computer; executing the codebody on the target computer; performing a computation which obtains the desired result, and returning the result to the requester. The persistent problem with RPE is security. Computational Devices offering RPE services are vulnerable to attack: if a general-purpose codebody is allowed to be remotely executed, this creates a security hole whereby hackers, impersonating the trusted authority or infiltrating the trusted domain, can insert general purpose programs which can be used to attack the remote machine. Perhaps more importantly, RPE is vulnerable to mistake, so that RPE is dangerous even in the presence of strong network security. Indeed, the configuration requestor, operating in good faith, can make a mistake in writing its query which can create an "infinite loop" or similar resource bind on the target computer, rendering the computer useless. Therefore, RPE is a dangerous option to employ.

Donoho et al disclose in U.S. Pat. No. 6,262,362 a method for inspecting the properties of a computer, the computer's configuration, the contents of the computer's storage device, the computer's peripherals, the computer's environment, or the computer's affiliated computers. The method involves phrasing queries of the computational state in a formal language, called the relevance language, and then automatically evaluating the queries in order to probe the state of the computational device. The evaluation requires first parsing a relevance clause in the relevance language, and then translating that into a sequence of desired "inspector evaluations". Inspectors are pre-defined measurement tools resident on the target computer. They are invoked to inspect the state of the computer. The invention also provides a method to extend the relevance language by building additional inspectors.

However, in the invention disclosed in the U.S. Pat. No. 6,262,362, the configuration information of computer is only used to perform relevance determination of an advice that is received by the computer. The primary purpose of the invention was not the communication or display of the configuration information, although it mentions a need to avoid the possibility of communicating information about a target computer to other party.

What is desired is a communication network that a configuration information provider retrieves the queries from a configuration requester, interprets the queries and automatically builds a human-readable, easily understood answer set.

What is further desired is a communication network allowing a configuration provider to communicate the configuration information securely to the configuration requester.

What is further desired is a communication network allowing a configuration requester to view and compare the received configuration information from the configuration information provider.

What is further desired is that a process satisfying the above desiderata be transparent—the queries should be written in an intuitive and non-threatening language reminiscent of plain English or other natural language and the answers can be read and understood by non-experts.

What is further desired is that a process satisfying the above desiderata be safe—robust against poorly formed or mistaken queries—in fact so robust that no well-formed query can contain infinite loops and other resource-monopolizing features.

What is further desired is that a process satisfying the above desiderata is extensible—the query language can expand over time as new properties need to be examined, within a natural and secure scheme.

SUMMARY OF THE INVENTION

The invention disclosed herein enables a collection of computers and associated communications infrastructure to offer a new communications process. This process allows requestors to compose and transmit query documents containing queries about configuration information to one or more targeted computational devices for those devices to compose and transmit response documents containing corresponding configuration information to requesters.

This process supports efficient solutions to a variety of problems in modern life, including assistance for the technical support of modern computers, assistance for the management of enterprise computing networks, and assistance for the management of server farms and other network resources. One can envision applications in many other areas as well, for example in the management of home appliances (as home appliances evolve to become networked computing devices) and in the management of maintenance of complex systems like automobiles and aircraft (as they evolve towards modular systems combined together as networks of many computational devices). In the technical support application, the disclosed invention provides an automatic, secure and fast way for a support technician of a technical support organization to query for configuration information of a customer's PC and receive an accurate, comprehensive response. The configuration information is delivered in encrypted form until it reaches the secure zone of the technical support organization where it is decrypted. So the privacy of configuration information of the customer's PC is protected and the security is guaranteed.

The presently preferred embodiment of this invention is specially tuned to address the concerns of consumers and providers in a technical support application. This particular embodiment of the invention is summarized as follows:

The responder obtains an identity number from the provider and passes the identity number to a configuration query reader associated with the computational device. The requester constructs a query document by associating a query script to the identity number and sends the query document from a private server 105 to a public server 104. The configuration query reader retrieves the query document, parses the queries, inspects the configuration, and obtains answers containing configuration information, constructs a response document, encrypts the response document and posts it to the public server 104. The private server 105 pulls the encrypted response document from the public server 104, decrypts the response document and displays it to the support technician.

The queries are written in a formal language called relevance language naming certain properties of the environment of the consumer computer, such as system configuration, file system contents, attached peripherals, or remotely accessible data. As a special purpose language explicitly for querying properties of computers, the relevance language has special features that make it distinguishable from a general programming language. These features include:

Transparency. Queries about the configuration are descried in a high-level language reminiscent of English, and self-explanatory in the sense that almost anyone can see what the query is asking for. In other words, it is intuitive and non-threatening;

Safety for remote evaluation. In general, remote program execution is insecure because a program in a general programming language could often be a virus, worm, or trojan horse, and there is basically no way from looking at a high-level procedural language program to guarantee that it is not a virus, worm, or trojan horse. However, the relevance language cannot be used for such purposes. It is not procedural and does not have the capabilities that could lead to problems in those languages—for example no infinite loops and no endless recursions, because there are no loops and no recursions. A poorly thought-through or malicious query is not going to crash the PC that looks at it.

Extensibility. In order for a language of limited scope and with tight security guarantees to expand to handle new situations, one needs to be able to extend its vocabulary, conveniently and securely. The system according to this invention is extensible due to its object-oriented nature.

The configuration reader parses the queries written in the relevance language and invokes specific inspectors which can return specific properties of the computer, its configuration, its file system, or other component of interest. In effect, the list of properties of the environment which may be referred to in the relevance language is determined by the contents of the inspector library installed at run-time. Because the relevance language has an appearance similar to simplified English, it is very intuitive and non-threatening, and responder review and approval of information transfer is a reasonable option. Also, because the relevance language is a descriptive rather than procedural language, routine evaluation of relevance clauses offers a degree of safety not possible in traditional settings like remote program execution. For example, the relevance does not offer traditional programming language constructs, like do-loops, variables, and subroutine calls, which can cause infinite loops. In fact, the relevance language does not suffer from the famous Turing halting problem affecting high-level procedural languages. Every evaluation of a relevance clause must halt.

The existence of standard inspector libraries provides the requester with a rich vocabulary for describing the state of the consumer computer and its environment. Since the collection of inspector libraries can be dynamically expanded by implementing new inspectors, the configuration information of the computational device the requestor is able to receive is easily expanded to areas that the current set of inspectors do not cover.

BRIEF DESCRIPTION OF THE DRAWINGS

FIG. 4 illustrates a sample instruction-set document as seen in one embodiment of the invention;

FIG. 14 illustrates a sample display that compares two snapshots so that the requestor can see the difference between them as seen in one embodiment of the invention.

DETAILED DESCRIPTION OF THE INVENTION

Figure 1:
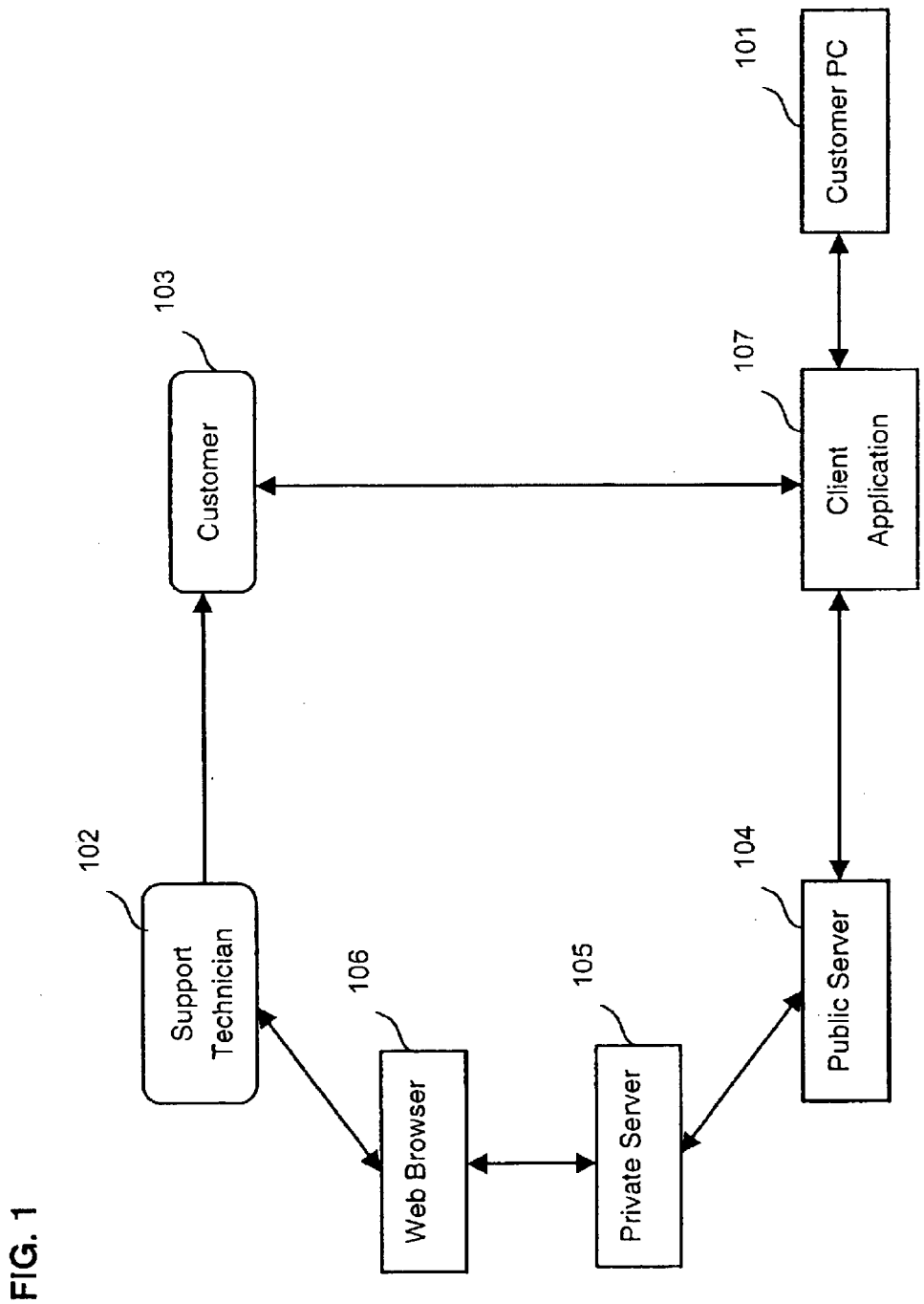
FIG. 1 is a block diagram illustrating a communications network in one embodiment of the invention.

The invention implements a process of communication which systematically solves the problem of allowing a trusted authority to obtain configuration information about a remote computational device over a communications network. The invention provides a communications system which depends on the use of computational devices connected by communications networks. In practice, these devices may range from traditional large-scale computers to personal computers to handheld personal information managers to embedded computational devices in the ambient environment, including consumer appliances such as remote controls and smart TVs, or other common computationally dense environments, such as transportation vehicles. The communications mechanisms could include a modem or other wired media, or wireless communications, using the Internet or other protocols, and could include the physical distribution of media. Whatever the specific instance, for purposes of the discussion herein, the computational device is referred to as a computer and the communications infrastructure is referred to as a network. Typical examples of such infrastructure include Intranets (private computer networks), and the Internet, the large public computer network that hosts the World Wide Web and related services.

The invention architecture is best understood if a specific terminology is adopted, which evokes a focused instance of the above described communications problem. The computational device whose configuration information is to be provided is referred as the target computer. The special digital documents conveying requests to retrieve certain configuration information of the computational device are referred to as query documents. The special digital documents conveying responses to the query documents to provide certain configuration information of the computational device are referred to as response documents. An information requestor is an organization or individual which requests configuration information of the target computer by sending query documents and receives responses. The requester is represented by one or more server computers in a communicating network of computers. The information provider is an organization or individual which receives query documents from the requestor and provides response documents to the requestor. The provider is represented by the target computer in a communicating network of computers.

It is helpful to think in concrete terms, and to suppose that the requestor is in fact a large organization running a large-scale server computer, that the provider is in fact an individual represented by a single personal computer, smart TV, personal information manager, computationally-enabled cell phone or other personal computational device; and to suppose that the network of computers may communicate according to a protocol similar to the TCP/IP protocol now in use by the Internet. In practice, many variations can be expected. For example, a requestor may constitute an individual represented by a personal computer, an advice provider may be a corporation represented by a large-scale computing engine, and the communications process underlying the invention may be realized with other protocols operating over other physical means of communication.

Using this terminology, it is now possible to describe a key purpose of the invention. The invention allows the information requestor to send requests to the information provider and receive configuration information of the target computer using the relevance language that makes the queries and responses easily understood by both participants.

Techinical Support Application

The invention is best illustrated by a technical support application that implements the invention. This application enables a support organization to obtain information about the configuration of an end-user PC, including the current configuration as well as the original configuration, or a configuration at some earlier time. In startup mode, a configuration reader running on the user PC observes various aspects of the configuration of a brand-new system and records a snapshot of that configuration information in escrow on the user PC for later retrieval by the technical support organization. In interactive mode, the configuration reader interacts with a support technician, in real-time over the Internet, to provide information about the current configuration of an end-user PC, or to retrieve previously escrowed files. The interaction between the technician and the user is easy and understandable to both participants, and the technician is able to get comprehensive information about a wide range of PC attributes very efficiently.

The communication network of a typical embodiment of the current invention is depicted in FIG. 1. The communications network comprises a customer 103 of a technical support organization, a customer PC 101, a support technician of the organization 102, a public server 104, and a private server 105. A client application 107, which is the configuration reader, runs on the customer PC 101, and the public server 104 and private server 105 are running inside the technical support organization. The support technician 102 interacts with the private server 105 using the Web browser 106 running on a Web client device. The requester comprises the support technician 102, the public server 104, the private server 105 and the Web browser 106. The responder comprises the customer 103, the customer PC 101 and the client application 107.

The private server 105 is responsible for sending query documents to the public server 104, retrieving response documents from the public server 104 and server response documents to the Web browser where the response documents can be displayed.

The public server 104 run by the support organization is responsible for serving the query documents to the client application 107, receiving response documents from the client application 107, and serving the response documents to the private server 105.

The client application 107 running on the customer PC 101 is responsible for retrieving query documents from the public server 104, inspecting the customer PC 101 to obtain configuration information and constructing response documents, and sending the response documents to the public server 104.

In standard use, the customer 103 obtains a Customer ID from the Tech Support technician 102, as a result of telephone, Web or e-mail contact. The customer 103 runs the client application 107 on his/her PC and provides the Customer ID to the client application 107. The client application 107 communicates with the public server 104, which then serves up a query document associated with that Customer ID. The query may ask about the properties of a few or many attributes of the PC configuration. The client application 107 inspects the PC to obtain the desired properties, and returns a response document in encrypted form to the public server 104 listing those properties. The public server 104 passes the response along to a private server 105 that decrypts and displays the configuration information to the support technician 102. Note that in certain deployments of the invention, there is no need for the Customer/Tech Support interaction to involve exchange of a unique Customer ID.

The query documents contains queries written in a formal language known as the relevance language. The relevance language has an intuitively understandable plain-English appearance, and can invoke the hundreds of existing Inspectors for the process of analyzing PC configuration and behavior. The queries can thus inspect the user PC for presence of certain hardware, software, files, registry entries, and configuration settings.

The technical support organization deploying the application as part of their support escalation process typically creates a collection of one or more query scripts, which direct the query process towards specific issues. Specific scripts can be invoked by the support technician 102 in response to specific symptoms or issues reported by the user. This library is a core asset for the technical support organization's call acceleration and support escalation procedures.

Because the invention uses the relevance language and its associated inspector technology, the scope of the query document is easily extensible: new vocabulary to the relevance language can be added simply by publishing new inspectors as the need arises. As new support issues arise, the support organization can write new query documents and make them available to their support technicians for use in future support sessions.

The invention is designed to streamline the configuration inquiry process while maintaining the concern for user privacy and trust. Following a consumer-oriented 'opt-in' philosophy, the invention sets up an interaction with the consumer's machine in which the consumer is aware that a transaction is taking place and is notified of all information being gathered by the technical support organization. The invention has a user interface component which notifies the user of a pending information exchange, requests approval prior to sending that information out from the user's computer, and allows the user to review the information to be sent. Further, to insure that the consumer's information is only made available to the intended technical support organization personnel, the information is securely encrypted before transmission. A chain of authentication is used to allow the support organization to control the extent of information collected during the process.

Document Types

Figure 2:
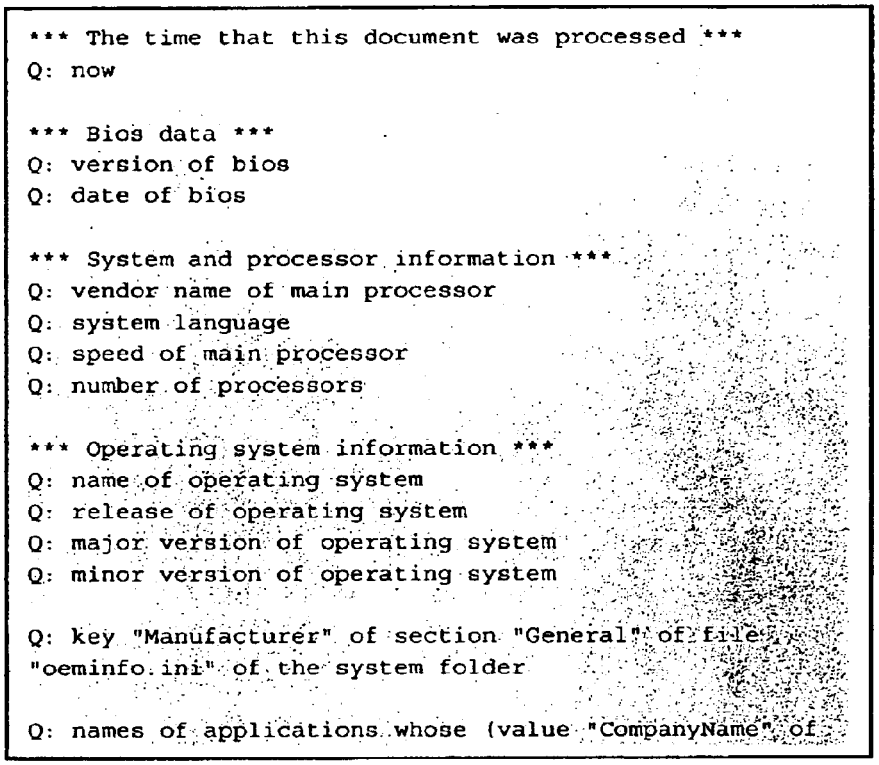
FIG. 2 illustrates a sample question set as seen in one embodiment of the invention.

The current invention involves creating and transferring of documents between the support organization and the end-user PC. These documents come in six different types:

Question-Set Document is the most important type of document used in current invention. It is a text file, containing questions written in the relevance language; the answers to these questions drive the next steps of the support process. Question-set scripts are composed by authorized technicians to diagnose key issues and problems, and are typically used in one of two ways. For interactive use, they are placed in a library made available to all support technicians to collect key configuration data; in escrow use, a specific question set is distributed with a new machine, for processing after the machine's first initialization. FIG. 2 illustrates an extraction 200 of an exemplary question set file.

The relevance language is an intuitive, English-like language, which is extremely powerful and provides access to enormous amounts of detail about the user's computer. For more information about the Relevance language, see U.S. Pat. No. 6,263,362, Donohue et al.

Figure 3:
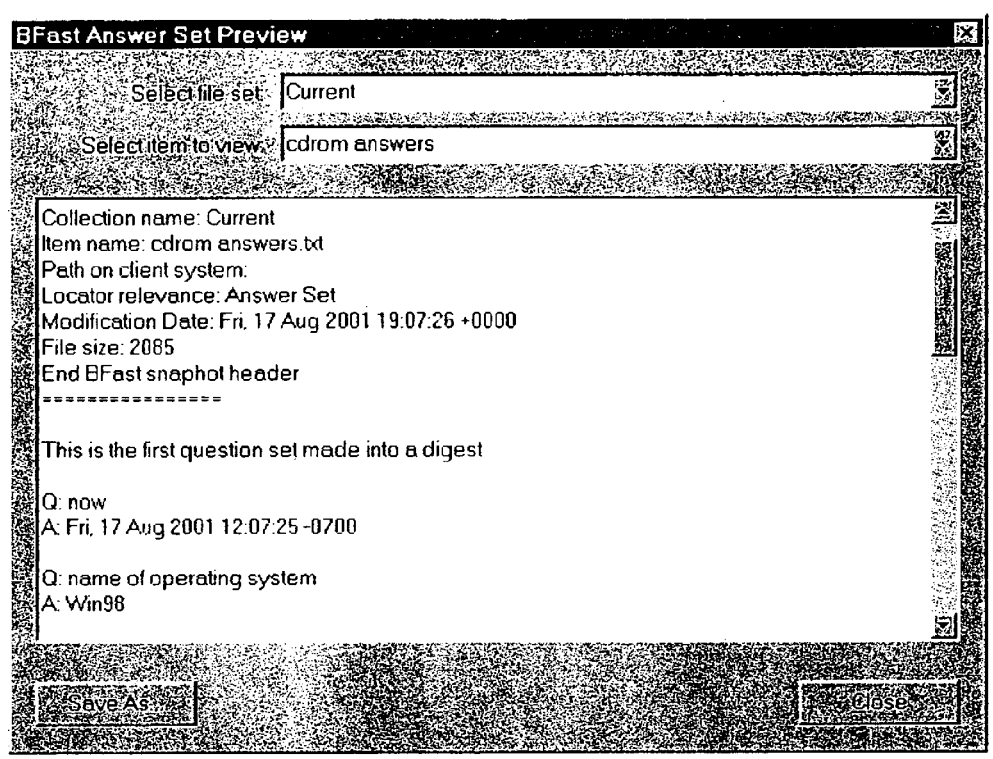
FIG. 3 illustrates a sample answer set containing the answers for the question set illustrated in FIG. 2.

The Answer-Set Document is the result of passing a Question Set document through the relevance engine. It is a text file that can be read and understood by laypersons or support technicians. FIG. 3 shows an extract 300 from an exemplary answer set file.

The Instruction-Set Document is a document describing the interaction to be performed on the end-user's PC. Interactions can be constructed which capture current configuration data to local storage and transfer current and prior configuration data to the support organization. Configuration data may contain one or more Answer-Set Documents as well as the contents of arbitrary data files specified via the relevance language.

FIG. 4 shows an extract 400 of an exemplary instruction-set file. A reader who can see it requests that a new snapshot be created, containing an answer-set created by the question-set cdrom.qna, as well as a copy of the win.ini file. It also requests that a Response document be created, containing both the current and the initial snapshots.

The Query Document is a digitally signed document, which serves as an envelope for an Instruction Set document, and which also contains identification and security parameters. This document is transmitted from the support organization to the User's PC; its arrival initiates analysis of the User's machine.

The Pointer Document is a Query document containing instructions that cause the configuration reader to query a server to collect a Digest document assigned to this customer by the support technician 102. This document is used to collect a Digest document, which then completes the collection process. It is used to set-up the exchange, by associating a technical support technician's query with a certain customer PC.

The Response Document is the result of processing a Digest document and may contain multiple Answer-sets as well as local files. This document is encrypted on the client prior to transmission to the technical support organization.

Figure 5:
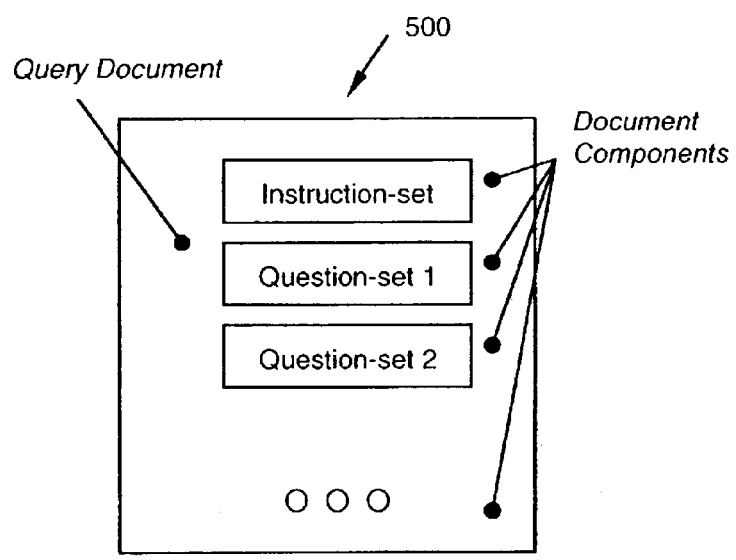
FIG. 5 illustrates the components of query document as seen in one embodiment of the invention.

FIG. 5 depicts an exemplary structure 500 of a query document. The queries for configuration information are contained in Question-set documents, but those are wrapped up inside of a Query document, along with an Instruction-set document which may, for example, contain instructions to take a snapshot of system configuration and place in escrow.

Figure 6:
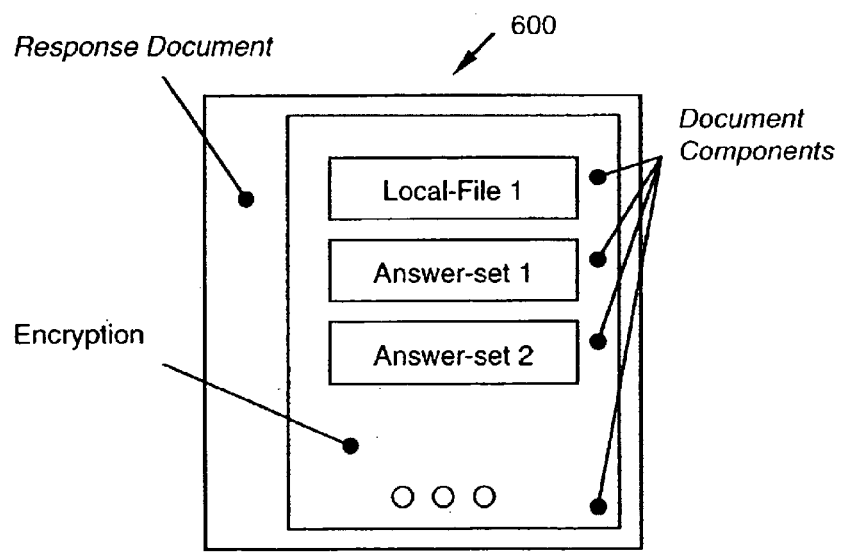
FIG. 6 illustrates the components of response document as seen in one embodiment of the invention.

FIG. 6 depicts an exemplary structure 600 of a response document. The Answer-sets are contained in Response documents, potentially several such answer-sets alongside each other, and alongside copies of the contents of certain local files as well. The Response document encrypts the whole package for passage over the Internet.

Description of Components

The technical support application is organized to offer performance and scalability on both client-side and server-side processes and to guard user privacy. It includes the following components:

The configuration reader contains a client application 107 that runs on the user PC, processing the Digest documents and Pointer documents. In interactive use, it performs the following steps:

Connecting with 'uagent' on the public server 104 (described below);

Gathering from the server a Query document that has been targeted to that user by the support technician 102;

Processing the Digest document to obtain the answers to the questions in a Question set, as well as configuration files, and prior configuration data;

Displaying the resulting data to the PC User; and,

Upon user approval, encrypting and sending this result back to 'uagent' on the public server 104.

The client application 107 typically uses http to communicate with the 'uagent' on the public server component.

The client user interface design streamlines the entire process for the user; the user can easily scroll through a window to see what is being returned, and can simply click 'Send' to send the information back to the public server 104. Because the relevance language is intuitive and reminiscent of plain English, users who choose to inspect an answer set has no difficulty understanding what queries are being posed and what answers are being returned.

The public server 104 hosts the 'uagent' cgi that provides services for the client application 107 and hosts the 'tagent' cgi that provides services for the Private server component (described below). These components are typically implemented as cgi applications that are invoked when certain http GET and POST operations are received from the configuration reader. The server stores Query documents and encrypted Response documents as they move back and forth during the process. Response documents are never decrypted in this environment, so even if this server is attacked, the users data remain private in this environment.

The Private Server 105 is a Customer Assisted Support Interface application (CASI) that executes in a more protected environment. It typically uses http to access the public server 'tagent' component. It is a stand-alone application which provides various services including:

Posting Query documents to the public server 104;

Monitoring the state of the public server 104 as Query documents are taken and Responses are returned;

Pulling encrypted Responses back into the Private Server 105 environment where they are decrypted and displayed to the support technician 102;

Maintaining an archive of past responses that may be accessed;

Providing interfaces that list achieved responses and display their results; and Providing facilities for comparing configuration data from one response or across responses. Thus a technician may zero in on changes to configuration data that could be the cause of a support issue.

This application is so designed that it can be easily integrated into existing systems.

The Support Technician Interface is typically composed of several perl scripts. This application has the following characteristics and functions:

It executes on the same machine as the CASI application;

It allows a support technician to associate any of a group of Query documents for staging to a customer referenced by a Customer ID;

It provides monitoring facilities to watch as the user collects and then returns the information;

It allows the technician to pull the response back to the protected server, decrypt and display it;

It allows access to all prior response data collected by the technician by Customer-ID;

Finally, it allows the technician to view changes to configuration data.

The invention guards the data integrity and privacy in two ways. First, underlying the publishing of queries is a chain of authorization to ensure that only Question-sets that have been explicitly authorized by the appropriate individuals in the technical support organization are recognized on customer PCs by the Configuration reader. Second, underlying the communications process is an encryption of the Response document before it leaves the Customer PC 101 for transit across the Internet, with decryption only taking place once the Response document arrives at the Private Server 105, which typically is only accessible from inside the support organization.

Both features rest on the use of public-key/private-key cryptography infrastructure. As a result, the invention requires creation and management of digital certificates and private key files. Publishing Tools are typically included to provide all the needed functionality, and these tools may be invoked through a command line interface.

Client Application Processing

The processing of the invention is friendly and natural to the end-user. When the client application 107 is run, it typically splashes a welcome screen that welcomes the customer into the process with the important information that he/she is in control of whatever information leaves the computer.

Figure 7:
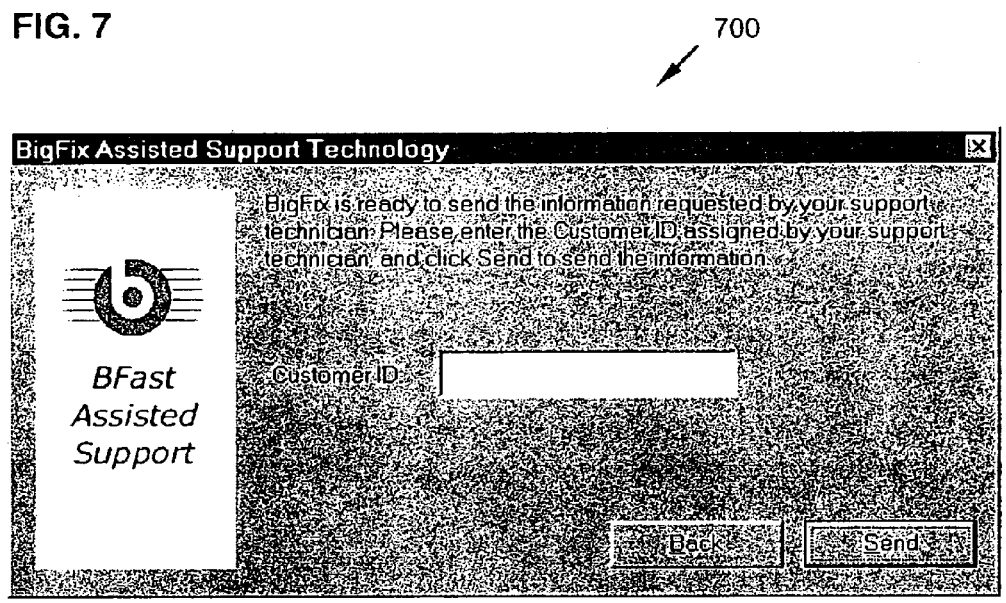
FIG. 7 illustrates a display the configuration reader provides for the responder to enter its identity number as seen in one embodiment of the invention.

After the user opts to continue, the application next displays a screen, asking for the Customer ID that was provided by the support technician 102. FIG. 7 shows an exemplary display 700 the configuration reader provides for the responder to enter its ID number.

Note that in some environments as described above, this step is skipped, because the Customer ID is already known/knowable to the application.

Behind the scenes, an exchange takes place, and at the heart of that exchange, a Question-set is transmitted from the Tech Support organization to the user PC. A simple example of such a question set is shown in FIG. 2. It contains a series of Questions of the form Q:<Query>, where <Query> denotes a phrase in the Relevance language. As the reader can see from the figure, the language has an English-like appearance This fragment provides only a superficial example of the types of queries that can be made in the Relevance language. More sophisticated queries can drill down to obtain extreme levels of detail about the system configuration.

The client application 107 inspects the Customer PC 101 to obtain the requested information, and constructs a corresponding answer set. The answer set contains all the Q: lines from the question-set, and interleaves corresponding A: lines which contain the answers to the Q: questions. Before sending the answer set to the technical support organization, the application displays a preview window as shown in FIG. 3 which allows the user to see what information has been requested by the technician and approve or deny the technician's request.

Because the Relevance language is very intuitive and non-threatening, user review and approval of information transfer is a reasonable option. In the above window, the user can see that the questions being answered concern the time at which the query was taken and the name of the operating system; using the scroll bar, more questions and answers would be revealed.

Figure 8:
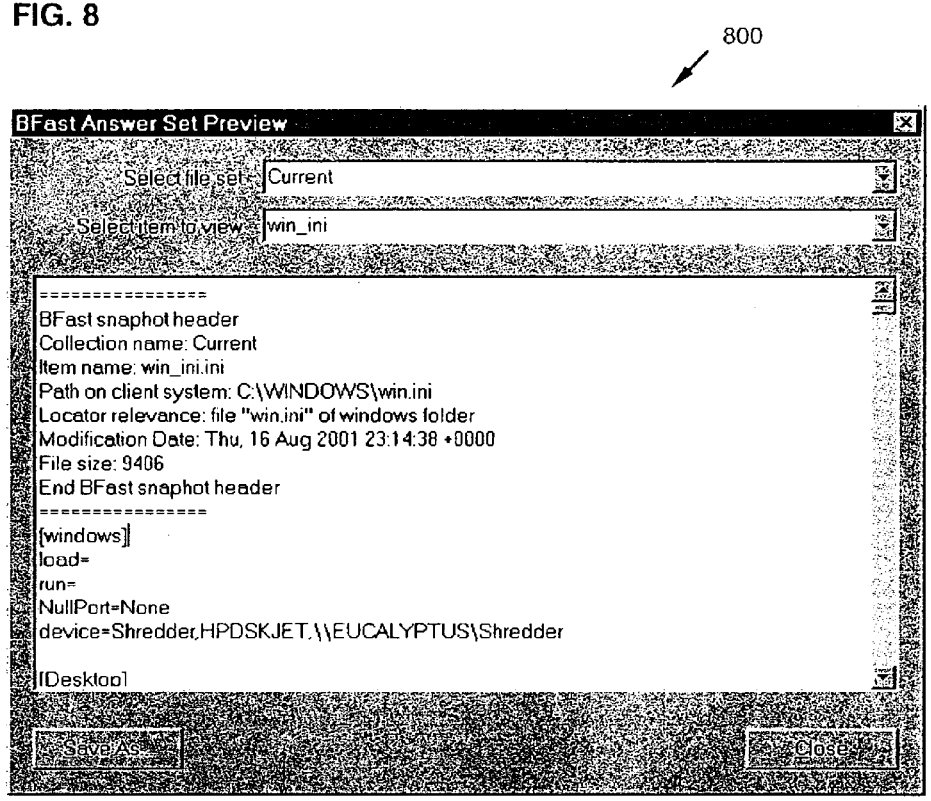
FIG. 8 illustrates another sample answer set containing content of a file stored in the computational device as seen in one embodiment of the invention.

In certain settings, the support technician 102 may request not merely information about the configuration, but actually a literal copy of a certain file. The application can comply with this request upon user approval. FIG. 8 shows a preview of an exemplary query 800 that asks for a copy of the win.ini file.

The user can thereby verify that the information being sent from the computer is information he/she is willing to share with the support organization.

Technician Interface Processing

Figure 9:
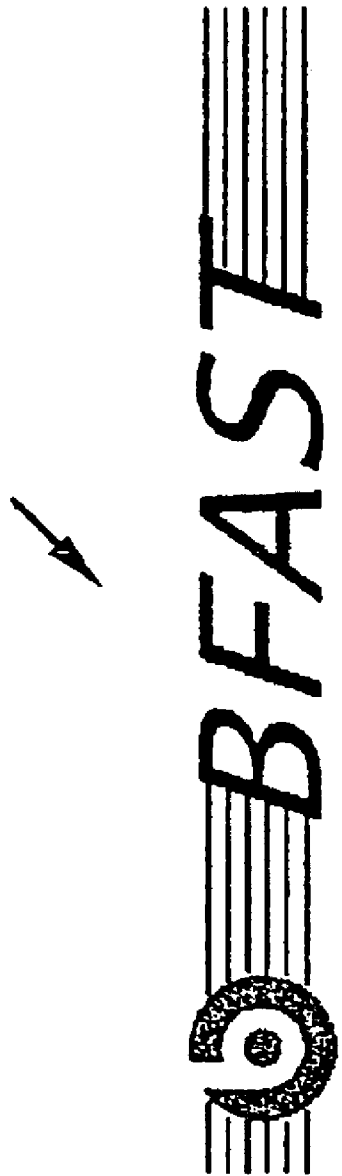
FIG. 9 illustrates a sample display where the requestor can input the identity number of the requestor as seen in one embodiment of the invention.

We now describe the process of the invention from a support technician's viewpoint. To begin with, the process is hosted on a standard Web browser, and an interaction starts with the technician entering a Customer ID. FIG. 9 illustrates an exemplary display 900 where the requestor can inputs the identity number of the requestor.

Figure 10:
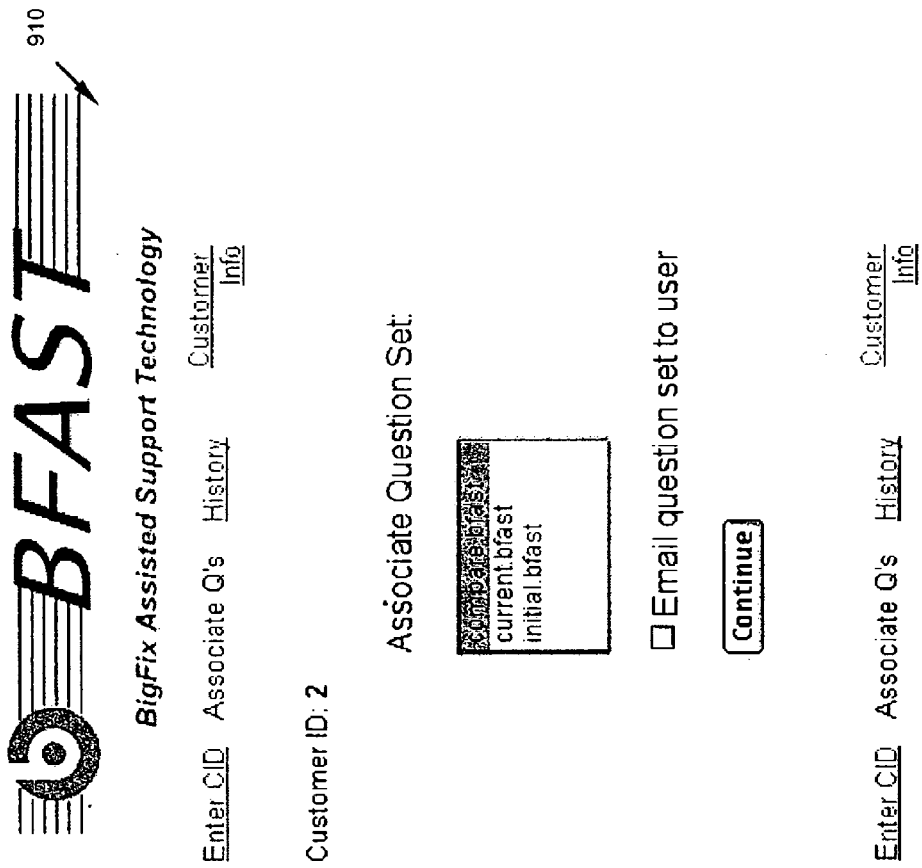
FIG. 10 illustrates a sample display where the requestor can associate a question set to a responder and send the question set to the responder as seen in one embodiment of the invention.

FIG. 10 illustrates an exemplary display 910 where the support technician 102 associates a question set to a responder and send the question set to the responder. In this case, assume the technician has entered the Customer ID "2". This page allows the support technician 102 to select specific Question-sets to be sent to the customer PC 101 to be answered by the configuration reader. Here, the technician has entered the Question-set "compare.bfast". In a typical operation, this Question-set is posted to the Public Server 104, where it is picked up by the configuration reader running on the customer PC.

Figure 11:
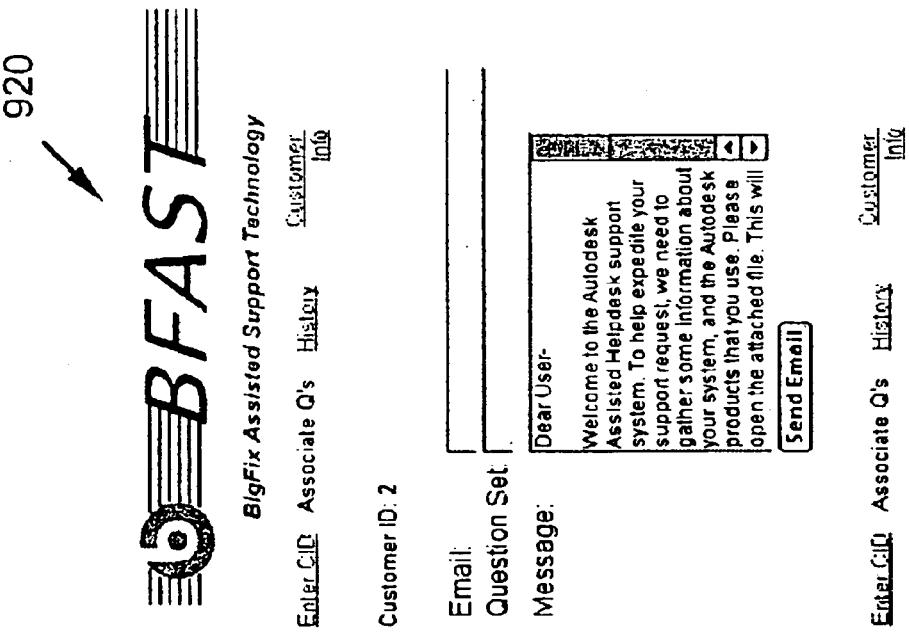
FIG. 11 illustrates a sample display where the requestor can send the question set to the responder by email as seen in one embodiment of the invention.

The support technician 102 may have an option to send the Question-set by e-mail FIG. 11 illustrates an exemplary display 920 where the support technician 102 sends the question set to the responder by email. The window allows the technician to include either custom or boilerplate text, and to attach a Question-set to the mail.

Figure 12:
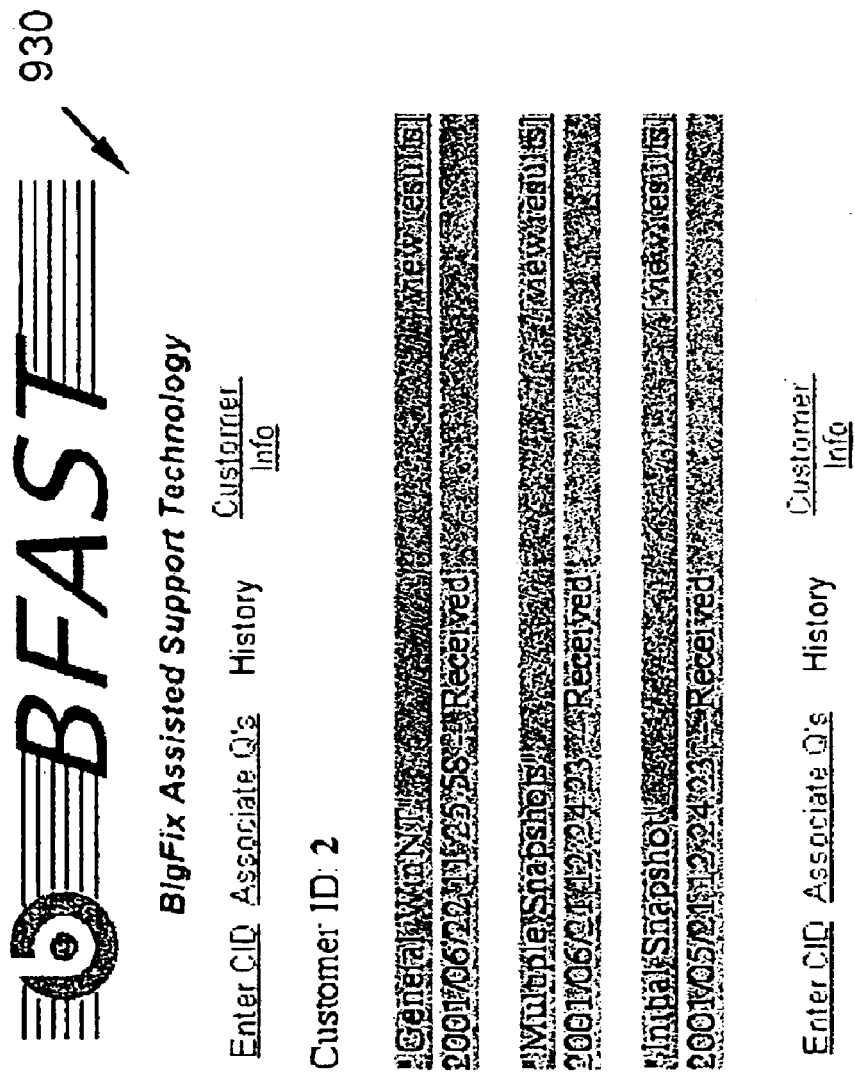
FIG. 12 illustrates a sample display that lists previously received responses from the responder by the requestor as seen in one embodiment of the invention.

No matter what method of query transport is chosen, the next stage of the interaction shows a history page, detailing the queries that have been sent, and the response status. FIG. 12 illustrates an exemplary display 930 that lists previously received responses from the responder by the support technician 102. In this case, three question-sets have been set to Customer #2—on different days a month apart—and the responses have been received in all three cases. The technician has the option of reviewing any or all of the results.

Figure 13:
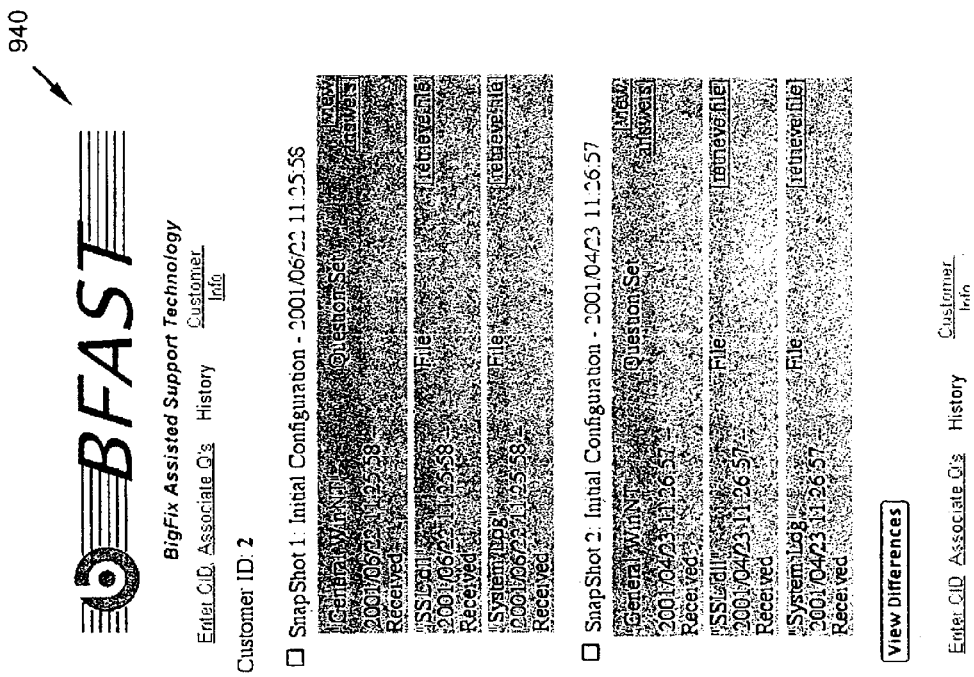
FIG. 13 illustrates a sample display that lists two different snapshots taken a few month apart on the same question-sets as seen in one embodiment of the invention.

An important feature of the technician interface is the availability to compare snapshots taken at different times. FIG. 13 illustrates an exemplary display 940 that lists two different snapshots taken a few months apart on the same question-sets. In this example, the technician is offered the option to compare the two files for differences.

If the support technician 102 so chooses, the interface can proceed to a correlation stage, where two or more files are compared to see what differences exist among the snapshots. FIG. 14 illustrates an exemplary display 950 for such a comparison. By inspecting this display, the technician can learn about which features may have changed from one snapshot to the next. In this example, all the displayed questions have the same answers in the two different snapshots.

The method steps described herein can be embodied in a set of computer readable instructions or codes which can be stored in any computer readable storage medium and can be transferred and downloaded over the Internet.

Although the invention is described herein with reference to the preferred embodiment, one skilled in the art will readily appreciate that other applications may be substituted for those set forth herein without departing from the spirit and scope of the present invention.

Accordingly, the invention should only be limited by the claims included below.

What is claimed is:

1. A communications network, comprising:

a computational device;

a requestor of configuration information of said computational device; and a responder associated with said computational device further comprising;

a configuration reader for retrieving configuration information of said computational device;

wherein said requestor sends one or more query documents for configuration information of said computational device to said responder;

wherein said query documents contains queries written in a high level query language which is descriptive rather than procedural;

wherein said configuration reader parses query documents from said requestor, inspects said computational device to obtain configuration information of said computational device by invoking one or more inspectors and returns corresponding configuration information of said computational device; and wherein said responder sends one or more response documents that contain corresponding configuration information to said requestor.

2. The communications network of claim 1, wherein said configuration reader is a computer program running on said computational device.

3. The communications network of claim 1, wherein said configuration information of said computational device comprising any combination of the following: properties, contents or state, or properties of a local environment associated with said computational device.

4. The communications network of claim 1, wherein said configuration information may or may not include a literal copy of a file stored in said computational device.

5. The communications network of claim 1, wherein said query documents are digitally signed by said requestor so that said responder can be sure that said query documents are from said requestor.

6. The communications network of claim 1, wherein said response documents are encrypted so that only said requestor can decrypt and view configuration information contained in said response document.

7. The communications network of claim 1, wherein said query language can be extended when new configuration information of said computational device are required.

8. The communications network of claim 1, wherein said responder further comprises a response instructor;

wherein said configuration information can be examined visually by said response instructor before sending said configuration information to said requestor.

9. The communications network of claim 1, wherein said requestor further comprises:

a request instructor; and a server;

wherein said request instructor posts query documents to said server that can only be retrieved by said responder;

wherein said responder retrieves said query documents from said server;

wherein said responder posts response documents to said server that can only be reviewed by said request instructor.

10. The communications network of claim 9, wherein said requestor further comprises a user interface for said request instructor to interact with said server.

11. The communications network of claim 10, wherein said request instructor reviews said answers contained in said response document through said user interface.

12. The communications network of claim 10, wherein said user interface is accessible from a Web browser.

13. The communications network of claim 9, wherein said server maintains an archive of past response documents that can be accessed by said request instructor.

14. The communications network of claim 9, wherein said server provides a means to compare two or more decrypted response documents.

15. In a communications network comprising a technical support organization, a support technician of said technical support organization and a customer of said technical support organization, an apparatus for said support technician to obtain configuration information of said customer's computer to accelerate analysis of technical support issues, said apparatus comprising:

a server run by said technical support organization;

a client application running on said customer's computer:

a query document containing queries written in a high level query language which is descriptive rather than procedural; and a response document containing corresponding configuration information required by said query document;

wherein said support technician posts said query document to said server, wherein said client application retrieves said query document from said server, parses said query document, inspects said computer to obtain configuration information of said computer by invoking one or more inspectors;

wherein said client application displays said configuration information to said customer;

wherein said client application returns corresponding configuration information of said computer to said server after approval of said customer; and wherein said support technician reviews said configuration information.

16. The apparatus of claim 15, wherein said query document is digitally signed so that said customer can be sure that said query document is sent by said technical support organization.

17. The apparatus of claim 15, wherein said response documents are encrypted so that only said support technician can decrypt and view configuration information contained in said response document.

18. In a communications network comprising a computational device, a requestor for configuration information of said computational device and a responder associated with said computational device to provider said configuration information, said responder further comprises a configuration reader for retrieving configuration information of said computational device, a method to retrieve said configuration information and securely transfer said configuration information from said responder to said requestor, comprising the steps of:

assigning an identity number to said responder by said requestor;

providing a library of query scripts written in a high level query language by said requestor, wherein said query language is descriptive rather than procedural;

said requestor constructing a query document by associating one of said query script to said identifier;

said requestor sending said query document to said responder;

parsing said queries written in said query language contained in said query document by said configuration reader of said responder;

invoking inspectors by said configuration reader to obtain answers containing configuration information corresponding to said queries; and upon responder's approval, constructing respond documents containing said answers and return said respond documents to said requestor.

19. The method of claim 18, wherein said configuration reader is a computer program running on said computational device.

20. The method of claim 18, wherein said configuration information of said computational device comprising any combination of the following: properties, contents or state, or properties of a local environment associated with said computational device.

21. The method of claim 18, wherein said configuration information may or may not include a literal copy of a file stored in said computational device.

22. The method of claim 18, wherein said query documents are digitally signed by said requestor so that said responder can be sure that said query documents are from said requestor.

23. The method of claim 18, wherein said response documents are encrypted so that only said requestor can decrypt and view configuration information contained in said response document.

24. The method of claim 18, wherein said query language can be extended when new configuration information of said computational device are required.

25. The method of claim 18, wherein said responder further comprises a response instructor;

wherein said configuration information can be examined visually by said response instructor before sending said configuration information to said requestor.

26. The method of claim 18, wherein said requester further comprises:

a request instructor; and a server;

wherein said request instructor posts query documents to said server that can only be retrieved by said responder;

wherein said responder retrieves said query documents from said server;

wherein said responder posts response documents to said server that can only be reviewed by said request instructor.

27. The method of claim 18, wherein said requestor further comprises a user interface for said request instructor to interact with said server.

28. The method of claim 18, wherein said request instructor reviews said answers contained in said response document through said user interface.

29. The method of claim 18, wherein said user interface is accessible from a Web browser.

30. The method of claim 18, wherein said server maintains an archive of past response documents that can be accessed by said request instructor.

31. The method of claim 18, wherein said server provides a means to compare two or more decrypted response documents.

* * * * *